United States Patent [19]

Suyama et al.

[11] Patent Number: 4,601,178

[45] Date of Patent: Jul. 22, 1986

[54] ICE-MAKING MACHINE

[75] Inventors: Tomio Suyama; Tadashi Sakai, both of Toyoake, Japan

[73] Assignee: Hoshizaki Electric Co., Ltd., Toyoake, Japan

[21] Appl. No.: 674,090

[22] Filed: Nov. 23, 1984

[30] Foreign Application Priority Data

Nov. 24, 1983 [JP] Japan .................. 58-180044[U]

[51] Int. Cl.⁴ ............................................... F25C 1/12
[52] U.S. Cl. ........................................ 62/347; 239/500; 239/520; 239/556; 239/DIG. 7
[58] Field of Search ............... 62/347, 74; 239/128, 239/500, 556, 566, 558, 520, DIG. 7

[56] References Cited

U.S. PATENT DOCUMENTS 3,074,252  1/1963  Tippmann et al. ............... 62/347
3,430,452  3/1969  Dedricks et al. ................. 62/347 X
4,458,503  7/1984  Nelson .............................. 62/347

Primary Examiner—William E. Tapolcai
Attorney, Agent, or Firm—Wenderoth, Lind & Ponack

[57] ABSTRACT

A water supply unit for an ice-making machine provided with a pair of freezing plates each presenting number of vertically extending partitions on their front sides, the freezing plates being mounted in an upright position with their rear sides facing to each other, and with a cooling coil mounted between the rear sides of the freezing plates. The water supply unit is placed on the top of the freezing plates and has an ice-making water conduit section connecting to the front surfaces of the freezing plates via water supply plates and a flushing water conduit section connecting to the rear sides of the freezing plates. The flushing water conduit section of the supply unit is received into and fitted between the upper ends of the freezing plates for securely positioning the water supply unit with respect to the freezing plates.

6 Claims, 4 Drawing Figures 4,601,178

ICE-MAKING MACHINE

BACKGROUND OF THE INVENTION

This invention relates to a water supply unit for an ice making machine or apparatus and, more particularly, to a unit including an ice-making water conduit section and a flushing water conduit section and adapted to be easily and positively mounted in position to a pair of upright freezing plates.

An ice-making machine or apparatus disclosed in our filed U.S. patent application Ser. No. 661,325, filed Oct. 16, 1984, and in application Ser. No. 660,485, filed Oct. 11, 1984 and assigned to the assignee of the present application, comprises a pair of upright freezing plates with a cooling coil of the freezing system clamped therebetween, a plurality of rib-like partition plates formed on the front sides of the freezing plates at a constant spacing from one another, a water supply unit on the top of the freezing plates, and a water saucer at the lower ends of the freezing plates. The water saucer and the water supply unit are connected together via a pipe by a circulating pump whereby the ice-making water is pumped in circulation to the freezing surfaces of the freezing plates. After the ice product is formed to a predetermined size, it is released from the freezing plates.

In this type of the ice product making apparatus, accurate setting of the mounting position of the water supply unit relative to the freezing plates is extremely difficult to achieve so that supply of ice-making water to the freezing plates tends to be unstable due to fluctuations in the mounting position of the water supply unit thus causing turbulence so that it is extremely difficult to yield ice products of uniform shape.

In the above described ice making apparatus, in order to release the ice products grown to a predetermined size from the freezing plates, a hot gas is supplied to the cooling coil and/or flushing or defrosting water is caused to flow on the rear sides of the freezing plates. The present invention is directed to such ice product making apparatus wherein at least the flushing or defrosting water is used in the harvesting cycle thereof.

SUMMARY OF THE INVENTION

It is a principal object of the present invention to provide highly effective means for obviating the above described shortcoming of the prior-art device by dexterously taking advantage of the specific structure of the flushing or defrosting water conduit section supplying the flushing water to the freezing plates. The present invention provides an arrangement in which the projecting flushing water conduit section of the water supply unit also provided with the ice-making water conduit section is received into and fitted between the opposing upper ends of a pair of juxtaposed upright freezing plates, in such a manner that the water supply unit is mounted in position on the top of the freezing plates so as to allow for uniform flow of the ice-making water down the freezing plates.

DESCRIPTION OF THE PREFERRED EMBODIMENT

The water sprinkler or water supply unit for an ice making machine or apparatus embodying the present invention is now explained by referring to the accompanying drawings.

Figure 1:
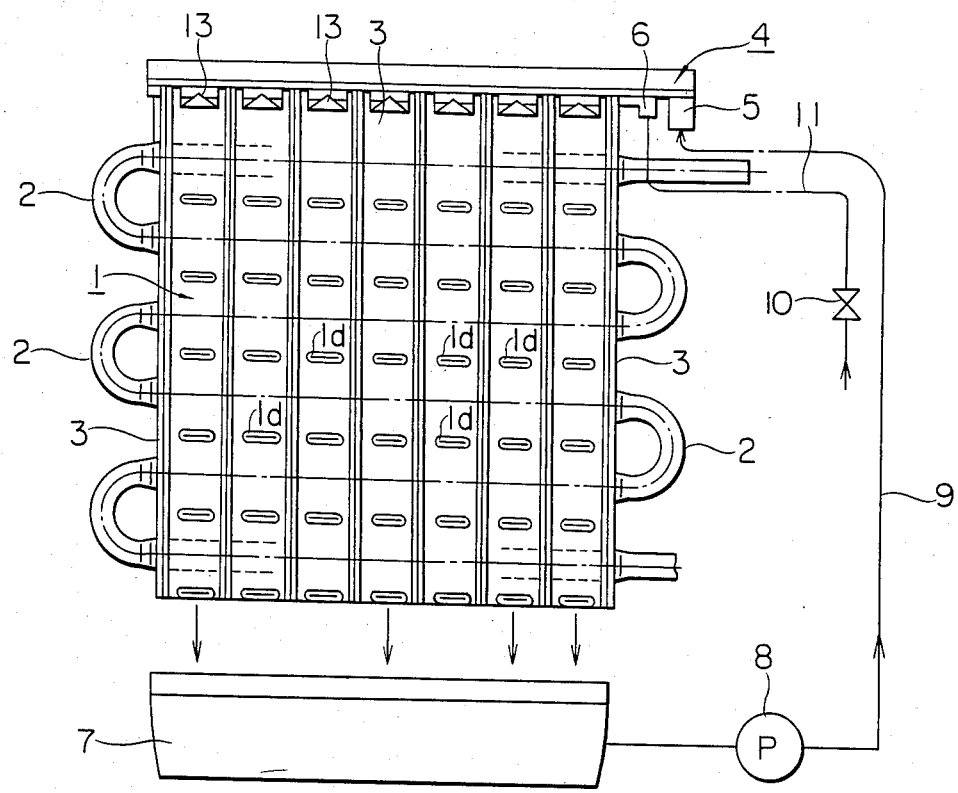
FIG. 1 is a front view showing the overall ice-making apparatus according to the present invention.
Figure 2:
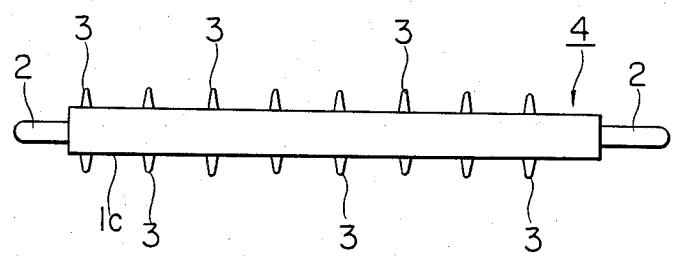
FIG. 2 is a diagrammatic plan view of the apparatus shown in FIG. 1.
Figure 3:
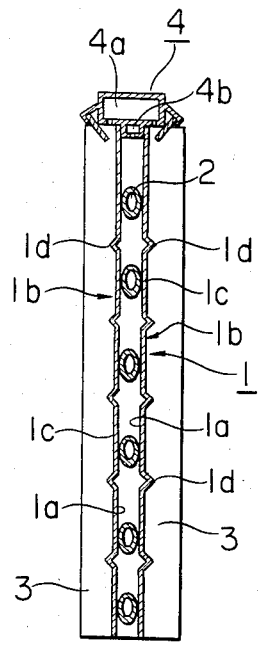
FIG. 3 is a side elevation, shown partly in cross-section, of the apparatus shown in FIG. 1.
Figure 4:
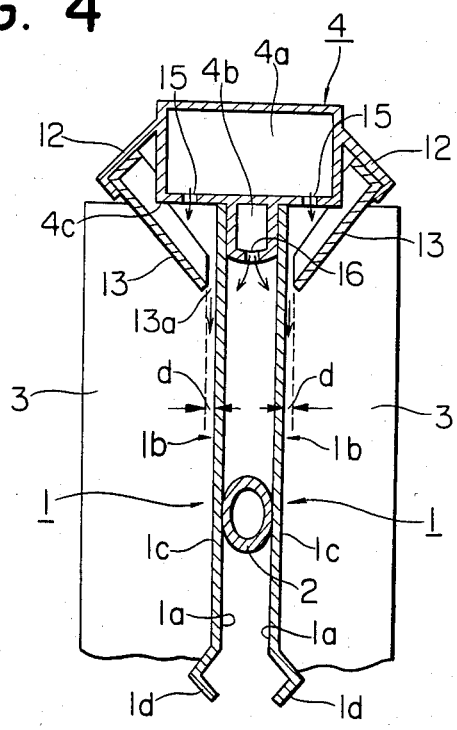
FIG. 4 is an enlarged cross-sectional view showing essential parts shown in FIG. 3.

Referring to FIGS. 1 to 3, the reference numeral 1 designates a pair of substantially upright freezing plates of a lower thermo-conductive material, such as stainless steel. These steel plates 1 are placed with their rear sides 1a facing each other with a small and constant gap therebetween and with a cooling coil 2 placed between the opposing rear sides 1a. The cooling coil 2 is secured to these rear sides as by welding or the like fastening means. The front sides, 1b of each freezing plate 1 are formed with vertically extending rib-like projections 3 that are V-shaped in cross-section and transversely spaced apart at a constant pitch from one another. On the rear sides 1b of the freezing plates 1, freezing sections 1c are defined by adjacent partitions 3, and a number of transversely elongated projections 1d are defined in each freezing section 1c between adjacent straight sections of the freezing coil 2.

On the top of the freezing plates 1, there is affixed a transversely extending water sprinkling or supply unit 4 comprised of an ice-making water conduit section 4a having a rectangular cross-sectional shape and a flushing water conduit section 4b of generally rectangular cross section provided to the lower side of the conduit section 4a. The conduit 4 is formed unitarily as by moulding so as to provide the vertically adjacent conduit sections 4a and 4b. These conduit sections 4a and 4b are formed so as to be slightly longer than the transverse extent of the freezing plates 1. At the ends of the ice-making water conduit section 4a and the flushing water conduit section 4b, there are provided an ice-making water supply port 5 and a flushing water supply port 6, respectively. The supply port 5 is connected by a pipe 9 to a circulating pump 8 connected to an ice-making water circulating tank 7 placed below the freezing plates 1, while the supply port 6 is connected to a pipe 11 via a magnetic valve 10.

On both sides of the supply conduit 4, there are formed a pair of inclined mounting plates 12. On each mounting plate 12, the same plurality of substantially L-shaped water guide plates 13 as the number of the freezing sections 1c on each freezing plate 1 are removably mounted in such a manner that the ice-making water from the ice-making water conduit section 4a is guided from ice-making water supply ports 15 via water guide plates 13 so as to reach and flow down along the associated freezing sections 1c. The flushing water conduit section 4b, which is formed with the lower side of the ice-making water conduit section 4a but may be formed separately and annexed to the section 4a, is received into and closely fitted between the upper ends of the freezing plates 1 (sandwiched between rear sides 1a) so that the water supply conduit 4 itself may be positioned with respect to the freezing plates 1 in a predetermined manner and the gap "d" between the foremost parts of the water guide plates 13 and the associated freezing sections 1c may be set accurately. The flushing water conduit section 4b is formed with a number of flushing water spray ports 16 via which the flushing water is sprayed onto the rear sides 1a of the freezing plates 1.

The water guide plates 13 may be constructed similarly to those used in our aforementioned filed application or may be provided with perpendicular side walls and a rear wall and inserted instead into the space defined between the mounting plate 12 and a corner 4c of the water supply conduit 4 from the lateral side thereof, that is, from the left or right side thereof in FIG. 1. When the water supply conduit 4 is mounted in position on the upper ends of the freezing plates 1, each water guide plate 13 is received in a space defined between the adjacent partitions 3.

In the ice-making operation of the above described water sprayer, a compressor, not shown, is actuated for supplying a cooling medium into the cooling coil 2, while the circulating pump 8 is also actuated for supplying the ice-making water in the circulating tank 7 to the freezing plates 1 in circulation via ice-making water conduit section 4a, ice-making water supply ports 15 and water guide plates 13, so that ice products are gradually formed on each freezing section 1c.

During harvesting, a hot gas is supplied to the cooling coil 2, while the magnetic valve 10 is opened for supplying flushing water to the rear sides 1a of the respective freezing plates 1 via flushing water spray ports 16 of the flushing water conduit section 4b for facilitating the release of the ice products.

It will be seen from the above described construction and operation of the water supply unit of the present invention that the spray unit itself may be easily and accurately attached to the upper ends of the freezing plates through the medium of the flushing water conduit section and, since the distance between the water guide plates and the associated freezing sections may be maintained constant and free of fluctuations, water turbulence may be avoided and the ice products of uniform shape may be formed on the freezing sections of the freezing plates. Also, since the flushing water conduit section is formed as one with the ice-making water conduit section in the water supply unit, there is no necessity to provide a separate flushing water circuit and not only the ice-making water supply ports but the flushing water spray ports may be positioned easily with resulting saving in time and labor of the assemblying operation.

What we claim is:

1. An ice-making machine comprising:
   a pair of approximately vertically extending, spaced apart, parallel freezing plates having respective opposing rear faces and having respective front faces opposite said rear faces, said front faces having vertically extending, horizontally spaced apart partitions projecting outwardly therefrom so as to provide between said partions portions of said front face defining freezer sections, said opposing rear faces being spaced apart by a predetermined gap;
   a cooling coil positioned between and secured to said rear faces in said gap; and
   a water supply unit on the top of said freezing plates, said water supply unit including an ice-making water conduit, water guide plates extending downwardly from said ice-making water conduit into respective spaces between adjacent ones of said partitions toward said freezing sections, so as to direct ice-making water from said ice-making water conduit onto the respective freezing sections and position said water supply unit with respect to said freezing plates, and a flushing water conduit unified with said ice-making water conduit, closely received in said gap at the top of said freezing plates so as to further and securely position said water supply unit with respect to said freezing plates, said flushing water conduit having means for spraying water therein downward onto said rear faces.

2. An apparatus as in claim 1, wherein said water supply unit further comprises inclined mounting plates fixed to said ice-making water conduit, said water guide plates being removably mounted to said mounting plates.

3. An apparatus as in claim 2, wherein said mounting plates extend downwardly and outwardly with respect to said ice-making water conduit and said front faces, and said water guide plates extend downwardly and inwardly toward said front faces.

4. An apparatus as in claim 1, wherein said ice-making water conduit and said flushing water conduit are integrally formed.

5. An apparatus as in claim 1, wherein said flushing water conduit is sandwiched between said rear faces of said freezing plates 6. An apparatus as in claim 1, wherein said gap has a constant horizontal width, said flushing water conduit having a generally rectangular vertical cross section and a horzontal width approximately equal to the horizontal width of said gap so that said flushing water conduit fits closely in said gap in contact with both of said rear faces at said top of said freezing plates.

* * * * *